United States Patent [19]
Neher

[11] 3,826,954
[45] July 30, 1974

[54] GROUND AUTOMATIC DISCONNECT SYSTEM

[76] Inventor: James A. Neher, 4640 151 Ct. S.E., Bellevue, Wash. 98006

[22] Filed: July 13, 1973

[21] Appl. No.: 379,025

[52] U.S. Cl.................... 317/135, 317/157, 307/85
[51] Int. Cl. ........................................... H01h 63/36
[58] Field of Search........ 317/135 R, 137, 139, 157; 307/64, 65, 85

[56] References Cited
UNITED STATES PATENTS
2,483,117  9/1949  Almassy.............................. 307/85
3,579,049  5/1971  Kikta.............................. 317/135 R Primary Examiner—J. D. Miller
Assistant Examiner—Patrick R. Salce
Attorney, Agent, or Firm—Harry A. Herbert, Jr.; William Stephanishen

[57] ABSTRACT

An automatic power disconnect apparatus for denying ground auxiliary power electrical supplies from needlessly energizing power circuits of an aircraft during the period when an aircraft is on the ground.

2 Claims, 1 Drawing Figure

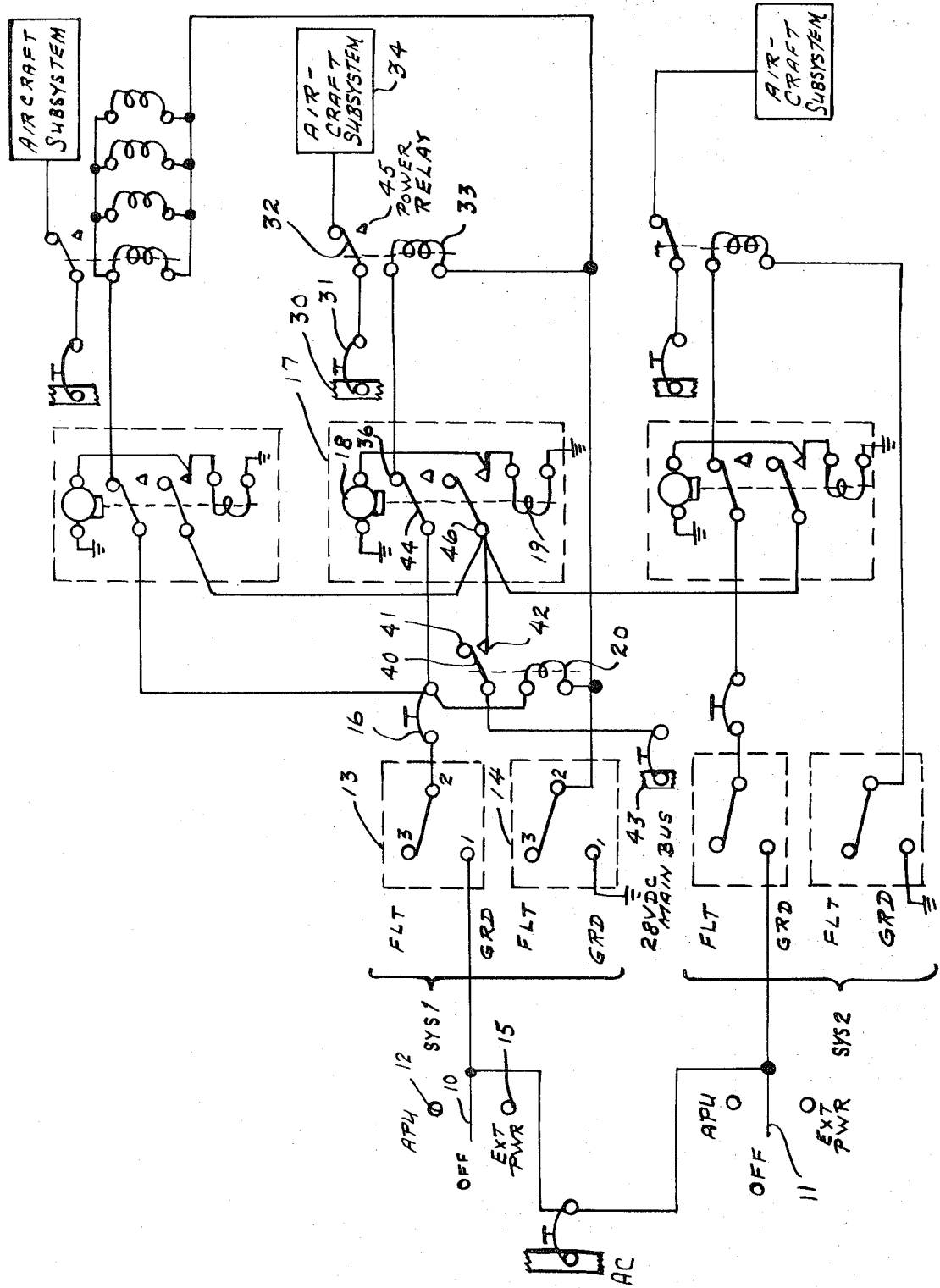

GROUND AUTOMATIC DISCONNECT SYSTEM

BACKGROUND OF THE INVENTION

The present invention relates broadly to an aircraft power control unit and in particular to an automatic power disconnect system to prevent undesired energizing of aircraft equipment.

Until recent years, aircraft electrical equipment operated almost exclusively from 28 volt direct current power. The control of on-board equipment was relatively simple since only the wire which was routed through an on-off switch, carried energy to an entire system. These systems generally lacked interface or interdependence, therefore, it was not only possible to easily switch a system "on" or "off" but to do it with little fear of interrupting collateral maintenance on other systems. However, the present day aircraft power distribution system is no longer simple. The use of 28 VDC, 26 VAC, and 115 VAC three phase power dictates that multiple wires be used for distribution rather than the single wire of former years. This is the primary reason for the elimination of simple on-off switches for system control. An additional motivation, however, is due to a severe increase in system interfaces which makes it difficult to define one unique system from another.

When system on-off switches are not provided, needless equipment operation can only be prevented by pulling numerous randomly located, awkwardly-identified circuit breakers. The use of this procedure caused gross abuse of equipment on the C-141 and C-5A. The recognizance of C-141 problems led to the installation of eighteen ground disconnect switches on power busses of the C-5A aircraft. Each ground disconnect switch controls the bus power to a group of one to nine circuit breakers in a hash-marked area adjacent to the switch. The technical orders state that a circuit breaker in the hash-marked area will be pulled prior to closing the adjacent ground disconnect switch if the circuit breaker provides power to an unwanted component; thus, up to eight circuit breakers must be pulled before closing a single ground disconnect switch. This same procedure must be repeated at two to four other hash-marked areas in order to properly turn a system "on." The reverse order is necessary to properly turn a system "off." Therefore, there exists a need for a control system which reduces or eliminates the unnecessary operation of electrically energized aircraft equipment while the aircraft is on the ground.

SUMMARY

The present invention utilizes relay circuits to automatically disconnect on-board electrical equipment from being energized by external ground power sources or auxiliary power circuits. Whenever an attempt is made to energize aircraft power bus bars by using either external power sources or auxiliary power circuits, the individual power circuits of the aircraft equipment are automatically opened before the aircraft bus bars are allowed to energize. Thereafter, the closure or opening of the circuits may be controlled by means of the control box. Thus, whenever an external power source or an auxiliary power circuit is utilized to operate on-board components while an aircraft is on the ground, an intentional control box action must be initiated before the desired equipment will become operable.

It is one object of the invention, therefore, to provide an automatic power disconnect apparatus to prevent needless operation of electrically operated aircraft equipment while the aircraft is on the ground.

It is another object of the invention to provide an automatic power disconnect apparatus to open the power circuits before the aircraft power bus bars are allowed to energize.

These and other advantages, objects and features of the invention will become more apparent from the following detailed description when taken in conjunction with the illustrative embodiment in the accompanying drawing wherein the FIGURE is a schematic diagram of the ground automatic power disconnect apparatus in accordance with the present invention.

DESCRIPTION OF THE PREFERRED EMBODIMENT

Referring now to the FIGURE, there is an automatic power disconnect system having a pair of ganged switches 10, 11 to provide either external power or auxiliary power to the aircraft subsystem. When switch 10 is placed in contact with terminal 12, an auxiliary power unit (not shown) will be connected to the control unit 13 of system 1. An external power source is applied to the control unit 13 when the switch 10 is placed in contact with terminal 15. System 1 has two control units 13, 14 which are separate switches having two positions. Before the aircraft is airborne, the control units 13, 14 are switched to the "flight" position which is terminal 3 in both control units. The ground automatic power disconnect system in the FIGURE is illustrated for two aircraft subsystems. These subsystems are substantially identical. However, it will be understood that the basic power control system which is illustrated is not necessarily limited to only two subsystems, but may be repeated to control all the subsystems on board the particular aircraft on which the present invention is installed. In order to facilitate a better understanding of the present invention only one subsystem will be described with the understanding that the operation of the other system is substantially identical.

The control unit 13 is connected through a circuit breaker 16 to pushbutton switch 17. The pushbutton switch 17 comprises a relay unit with an illuminated magnetically held pushbutton switch. The relay unit is shown in the normally de-energized position. When the pushbutton 18 is pushed, both relay contacts will be switched to the energized position and the relay coil 19 will be energized by the 28 volts dc which is available when control units 13 and 14 are placed in position 1 (ground). Once relay coil 19 is energized, pushbutton 18 is illuminated to indicate that it is on and is magnetically held in the on position by the relay. In order to de-energize pushbutton switch 17, the power to the relay coil 19 must be interrupted or turned off. One way in which relay coil 19 may be de-energized is to place the switch of control unit 14 in position 3, the flight position. This action will remove the ground connection from relay coil 20 which de-energizes the relay and in turn disconnects the 28 volts d.c. from the relay coil 19 of pushbutton switch 17. A bus bar 30 is connected through circuit breaker 31 and relay arm 32 of power relay 33 to an aircraft subsystem unit 34. The aircraft subsystem unit 34 may be any typical aircraft subsystem such as the central air data computer. The power relay 33 which is shown in the de-energized position receives its energizing power from terminal 36 of pushbutton switch 17.

When an aircraft is on the ground and is receiving power from either an auxiliary power unit or some other external power source, the operation of the ground power disconnect system will be as follows. Switch 10 will be placed in either position APU or Ext. Pwr. to provide a source of power to the aircraft. The control units 13, 14 will be switched from the flight position 3 to the ground position 1. When this action occurs, the following actions will take place. Relay coil 20 will be energized, switching arm 40 from contact 41 to contact 42 and thus applying 28 volts d.c. from power bus 43 to terminal 46 of pushbutton switch 17. Before aircraft bus bars are energized, however, power will be applied to power relay 33 through circuit breaker 16, arm 44, and terminal 36. When power relay 33 is thus energized, it switches relay arm 32 to the open contact 45, thereby removing the aircraft subsystem 34 from its power source 30 before power source 30 becomes energized. Therefore, it may be seen that, when the control units 13, 14 are in the ground position when power is applied to the aircraft, the power to all on-board aircraft subsystems will be automatically disconnected. In order to energize aircraft subsystem 34, an intentional action must be initiated by pushing pushbutton 18 in. When this is done, the pushbutton 18 will be illuminated to indicate that it has been activated and relay coil 19 will be energized, opening the power connection to power relay 33. The power relay 33 is thus de-energized and relay arm 32 returns to the de-energized position, applying power to the aircraft subsystem unit 34.

Although the invention has been described with reference to a particular embodiment, it will be understood to those skilled in the art that the invention is capable of a variety of alternative embodiments within the spirit and scope of the appended claims.

I claim:

1. A ground automatic power disconnect apparatus comprising in combination:

a first control unit to receive a source of external power, said first control unit having a first and second terminal and a contact arm, said first terminal being connected to said external power source, said contact arm providing an output of said external power when placed in contact with said first terminal, said contact arm being switched to said second terminal to prevent passage of said external power.

a pushbutton switch connected to said first control unit to receive said external power, said pushbutton switch comprising a relay coil, a first and second relay contacts, and a pushbutton, said first relay contact comprising a first switchable contact arm and a first and second contact terminal, said second relay contact comprising a second switchable contact arm and a third and fourth contact terminal, said first switchable contact arm being connected to said contact arm of said first control unit, said first switchable contact arm being connected to said first contact terminal in the de-energized state, said second switchable contact arm being connected to said third contact terminal in the de-energized state, said fourth contact terminal being connected to one end of said relay coil and to said pushbutton, the other end of said relay coil being connected to ground, a second control unit having a first and second terminal and a contact arm, said first terminal being connected to ground, said contact arm being switched to said second terminal to de-activate the ground automatic power disconnect apparatus before flight, said contact arm being switched to said first terminal to provide an output ground, a switching relay having a relay coil, a switchable contact arm, and a first and second terminal, one end of said relay coil being connected to said contact arm of said second control unit, the other end of said relay coil being connected to said contact arm of said first control unit, said switchable contact arm being connected to a 28 volt d.c. power bus, said switchable contact arm being connected to said first terminal in the de-energized state, said first terminal being open-circuited, said second terminal being connected to said second switchable contact arm of said pushbutton switch, and a power relay to control the electrical energizing of an aircraft subsystem, said power relay comprising a relay coil, a switchable arm, and a first and second contact terminal, said switchable arm being connected to an aircraft power bus, said first contact terminal being connected to said aircraft subsystem, said switchable arm being connected to said first contact terminal in the de-energized state, said second contact terminal being open-circuited, one end of said relay coil being connected to said contact arm of said second control unit, the other end of said relay coil being connected to said first contact terminal of said pushbutton switch, said switching relay being energized when said first and second control units are switched to said first terminals respectively, said switchable contact arm being thus switched to contact said second terminal of said switching relay and apply 28 volts D.C. to second switchable contact arm of said pushbutton switch, said power relay being energized by said first control unit and said second control unit to switch said switchable arm to said second contact terminal thus de-energizing said aircraft subsystem.

2. A ground automatic power disconnect apparatus as described in claim 1 wherein said aircraft subsystem is energized by pressing said pushbutton on, said relay coil of said pushbutton switch being energized and switching said first switchable contact to said second contact terminal, said second switchable contact being switched to said fourth contact terminal to maintain said relay coil in the energized state, said pushbutton being magnetically held on by said relay coil, said power relay being thus de-energized, said switchable arm of said power relay being switched to said first contact terminal and energizing said aircraft subsystem.

* * * * *